United States Patent
Zaffino et al.

(10) Patent No.: US 9,432,514 B2
(45) Date of Patent: *Aug. 30, 2016

(54) PROVIDING AND USING A MEDIA CONTROL PROFILE

(71) Applicant: AT&T Mobility II LLC, Atlanta, GA (US)

(72) Inventors: Richard Zaffino, Kirkland, WA (US); Andrew T. Smoak, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/083,806

(22) Filed: Nov. 19, 2013

(65) Prior Publication Data

US 2014/0080455 A1 Mar. 20, 2014

Related U.S. Application Data

(60) Continuation of application No. 13/489,981, filed on Jun. 6, 2012, now Pat. No. 8,588,794, which is a division of application No. 13/019,043, filed on Feb. 1, 2011, now Pat. No. 8,208,908, which is a continuation of application No. 11/670,824, filed on Feb. 2, 2007, now Pat. No. 7,904,061.

(51) Int. Cl.
| | | |
|---|---|---|
| *H04M 3/54* | (2006.01) | |
| *H04M 3/533* | (2006.01) | |
| *G11B 27/10* | (2006.01) | |
| *H04M 1/725* | (2006.01) | |
| *H04W 4/16* | (2009.01) | |

(52) U.S. Cl.
CPC ........ *H04M 3/53308* (2013.01); *G11B 27/105* (2013.01); *H04M 1/72519* (2013.01); *H04W 4/16* (2013.01); *H04M 1/72558* (2013.01)

(58) Field of Classification Search
USPC ...... 455/412.1, 412.2, 413, 414.1, 417, 418, 455/445; 379/211.02
See application file for complete search history.

(56) References Cited

U.S. PATENT DOCUMENTS

| | | | |
|---|---|---|---|
| 6,704,582 B2 | 3/2004 | Le-Faucheur et al. | |
| 6,947,728 B2 | 9/2005 | Tagawa et al. | |
| 7,164,759 B2 * | 1/2007 | Lebowitz et al. | 379/142.03 |
| 7,203,294 B2 * | 4/2007 | Carnazza et al. | 379/142.07 |
| 7,853,649 B2 | 12/2010 | Lee et al. | |
| 7,869,580 B2 | 1/2011 | Tagawa et al. | |
| 8,594,298 B2 * | 11/2013 | Klein et al. | 379/211.02 |

(Continued)

OTHER PUBLICATIONS

U.S. Office Action dated Dec. 22, 2009 in U.S. Appl. No. 11/670,824.
U.S. Office Action dated Jun. 25, 2010 in U.S. Appl. No. 11/670,824.

(Continued)

*Primary Examiner* — Blane J Jackson
(74) *Attorney, Agent, or Firm* — Hartman & Citrin LLC

(57) ABSTRACT

A media control profile is described herein. The media control profile provides a number of selectable pre-defined and/or user-defined settings to manipulate the functionality of a hybrid telecommunications and entertainment mobile device. Three basic modes of operation, namely a telecommunications-only device mode, an entertainment-only device mode, and a hybrid telecommunications and entertainment device mode are provided. Settings associated with one or more of these basic modes are combined to form a media control profile for the hybrid mobile device.

19 Claims, 13 Drawing Sheets

(56) References Cited

U.S. PATENT DOCUMENTS

| | | |
|---|---|---|
| 2001/0033736 A1 | 10/2001 | Yap et al. |
| 2004/0176079 A1 | 9/2004 | Fratti |
| 2005/0239446 A1 | 10/2005 | Tagawa et al. |
| 2006/0072726 A1* | 4/2006 | Klein et al. ............. 379/201.01 |
| 2007/0042801 A1 | 2/2007 | Miyata |
| 2007/0129067 A1 | 6/2007 | Summer et al. |
| 2007/0149185 A1 | 6/2007 | Song et al. |
| 2007/0255565 A1 | 11/2007 | Yu et al. |
| 2007/0300269 A1 | 12/2007 | Roberts et al. |
| 2008/0046406 A1 | 2/2008 | Seide et al. |

OTHER PUBLICATIONS

U.S. Notice of Allowance dated Nov. 1, 2010 in U.S. Appl. No. 11/670,824.

U.S. Supplemental Notice of Allowability dated Dec. 15, 2010 in U.S. Appl. No. 11/670,824.

U.S. Office Action dated Aug. 19, 2011 in U.S. Appl. No. 13/019,043.

U.S. Notice of Allowance dated Mar. 7, 2012 in U.S. Appl. No. 13/019,043.

U.S. Notice of Allowance dated Jul. 9, 2013 in U.S. Appl. No. 13/489,981.

* cited by examiner

PROVIDING AND USING A MEDIA CONTROL PROFILE

CROSS REFERENCE TO RELATED APPLICATIONS

This application is a continuation of U.S. application Ser. No. 13/489,981, filed Jun. 6, 2012, (now U.S. Pat. No. 8,588,794), which is a division of U.S. patent application Ser. No. 13/019,043, filed Feb. 1, 2011 (now U.S. Pat. No. 8,208,908), which is a continuation of U.S. patent application Ser. No. 11/670,824, filed Feb. 2, 2007 (now U.S. Pat. No. 7,904,061), the entireties of which are herein incorporated by reference.

TECHNICAL FIELD

The present invention relates generally to mobile devices and, more particularly, to media control profiles for hybrid telecommunications and entertainment mobile devices.

BACKGROUND

Mobile devices typically utilize profiles to organize different types of alerts to facilitate conditions under a variety of scenarios. Profiles such as loud, soft, silent, vibrate, and the like manipulate the volume and type of alert that is presented to a user, for example, during an incoming call, upon receipt of a message, upon receipt of a voicemail, and other alerts common on mobile devices. Profiles allow the user to quickly and easily change a number of settings that would otherwise require more extensive manipulation.

Today, mobile phones are migrating from single purpose telecommunication devices to multi-purpose hybrid telecommunications and entertainment devices. These hybrid mobile devices offer the combined functionality of conventional mobile telecommunications devices and entertainment devices, such as portable media players.

Hybrid mobile devices are becoming increasingly prevalent. This prevalence will stimulate the need for new ways to control the additional features inherently provided by the increased functionality of a hybrid mobile device. Thus, it is desirable to offer profiles to control telecommunications and entertainment features of these devices.

SUMMARY

In order to control the additional features described above, the present invention employs the use of a media control profile. A media control profile, according to the present invention, can be stored locally in a memory of a hybrid mobile device or remotely in a network node. The media control profile can provide a number of pre-defined and/or user-defined primary settings and optionally a number of secondary, tertiary, or further degree settings to manipulate various functionality of the hybrid mobile device. Base profiles that provide exclusive telecommunications functionality, exclusive entertainment functionality, and combined telecommunications functionality and entertainment functionality may be used. These profiles can be modified by the addition of any number of settings.

Accordingly, a hybrid mobile device is provided that includes a transceiver, a processor, and a memory. The memory is configured to include at least one media control profile. The media control profile includes at least one setting configured to make the processor operable to manipulate the functionality of the device. The media control profile can be used to control any media type such as still images, audio, and video.

In one embodiment a hybrid mobile device comprises a transceiver configured to allow the hybrid mobile device to communicate with a communications network via any means for wireless communication; a processor operatively linked and in communication with the transceiver; and, a memory, operatively linked and in communication with the processor wherein the memory comprises at least one media control profile and at least one media file—an image file, an audio file, and/or a video file—and the media control profile comprises at least one setting configured to make the processor operable to identify the hybrid mobile device as a telecommunications device, an entertainment device, and/or a hybrid telecommunications and entertainment device.

In another embodiment, a hybrid mobile device, comprises a transceiver configured to allow the hybrid mobile device to communicate with a communications network via any means for wireless communication; a processor operatively linked and in communication with the transceiver; and a memory, operatively linked and in communication with the processor; wherein the memory comprises at least one media control profile and at least one media file comprises at least one of an image file, an audio file, and a video file, and wherein the media control profile comprises at least one setting configured to make the processor operable to create a snippet from the media file.

A communications system for managing media control profiles is also provided. The communications system includes at least one hybrid mobile device capable of communication with a host node. The host node includes a database configured to store data corresponding to a number of media control profiles and optionally a number of media files.

In one embodiment, a communications system for managing media control profiles comprises at least one hybrid mobile device capable of communication with a host node comprising: a memory configured to store at least one media control profile comprising at least one setting configured to identify the hybrid mobile device as one of a telecommunications device, an entertainment device, and a hybrid telecommunications and entertainment device; and a transceiver, configured to transmit the media control profile to the hybrid mobile device.

A method for managing at least one media control profile for a hybrid mobile device is provided, the method comprising the steps of: determining if at least one media control profile is loaded, the media control profile comprising at least one setting configured to make a processor operable to manipulate the functionality of the hybrid mobile device; enabling the setting, if the media control profile is loaded; if the media control profile is not loaded determining if the media control profile is available; loading the media control profile if the media control profile is available and enabling the setting; if the media control profile is not available creating a new media control profile; loading the new media control profile; and enabling the setting.

Also a method for creating a snippet from a media file for play on a hybrid mobile device is provided, the method comprising: selecting a media file comprising an image file, an audio file, and/or a video file; defining a begin point and an end point for the creation of a snippet; creating the snippet based upon the begin point and the end point; and presenting the snippet on a hybrid mobile device.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION OF THE INVENTION

Figure 1:
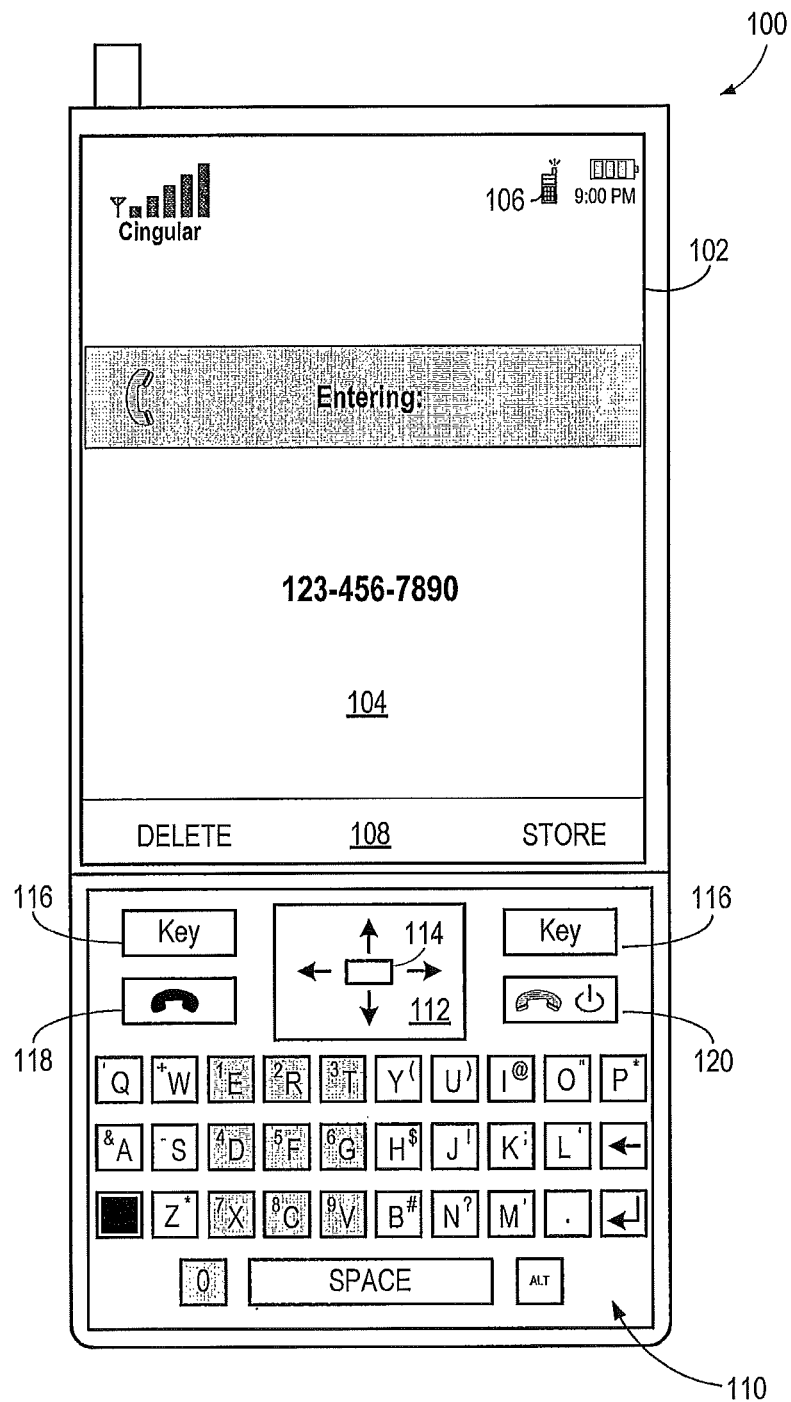
FIGS. 1-8 illustrate various exemplary screens on a hybrid mobile device, according to the present invention.

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

As used herein, the term hybrid mobile device refers to a mobile device configured to function as a telecommunications device and an entertainment device. In the illustrated embodiments, the entertainment functionality is that of audio playback. It is contemplated, however, that alternative embodiments of the present invention may encompass alternative media such as video, images, and combinations thereof with or without the addition of audio.

One embodiment of a hybrid mobile device according to the present invention, utilizes three basic modes. In a first mode, the hybrid mobile device provides exclusive functionality as a telecommunications device. In a second mode, the hybrid mobile device provides exclusive functionality as an entertainment device, for example, a media player. In a third mode, the hybrid mobile device provides dual-functionality providing feature sets of both a telecommunications device and an entertainment device. It is contemplated, however, that alternative modes beyond those described herein may be utilized and pertinent aspects of the present invention accordingly changed.

In an exemplary embodiment, the hybrid mobile device is configured to store a media control profile that includes one or more sets of settings that define the functionality of the hybrid mobile device, the user interface of the hybrid mobile device, and other aspects of the hybrid mobile device as described herein. In another exemplary embodiment, the hybrid mobile device is configured to be in communication with a network node that is configured to store and dynamically update a media control profile for a plurality of user's hybrid mobile devices. Multiple media profiles for a hybrid mobile device are also contemplated.

Various settings and other features of a media control profile are described herein. Additional and/or alternative setting and/or features not described herein that adhere to the various aspects of the present invention are also considered.

In general, the hybrid mobile device may be any device capable of performing the functions described herein. Further, the hybrid mobile device may be any style such as, but not limited to, a flip style, a slide style, an open-face style, and the like. Furthermore, the hybrid mobile device may utilize any input/output means as is known to those skilled in the art and is not limited by those input/output means described herein. Further still and by way of example and not limitation, the means for wireless communication used by the hybrid mobile device can include Frequency Division Multiple Access (FDMA), Time Division Multiple Access (TDMA), Global System for Mobile Communications (GSM), Wideband Code Division Multiple Access (WCDMA)/Universal Mobile Telecommunications System (UMTS), General Packet Radio Service (GPRS), Enhanced Data rates for Global System for Mobile Communications Evolution (EDGE)/Enhanced Generic Packet Radio Service (EGPRS), Code Division Multiple Access (CDMA), Code Division Multiple Access 2000 (CDMA2000), any combination and/or variation thereof, and the like.

Referring now to the drawings in which like numerals represent like elements throughout the several views, FIG. 1 illustrates a hybrid mobile device 100 that is in a telecommunications-only device mode. The illustrated hybrid mobile device 100 includes a display 102 on which a number entry screen 104, a mobile device status icon 106, and a soft key menu 108 are displayed. The display 102 may be, for example, an electronic paper display, a vacuum fluorescent display (VFD), a liquid crystal display (LCD), a light-emitting diode (LED) display, an organic light-emitting diode (OLED) display, a plasma display, a surface-conduction electron-emitter display (SED), a carbon nanotube (CNT) display, a nanocrystal (NC) display, any combination and/or variation thereof, and the like.

Figure 2:
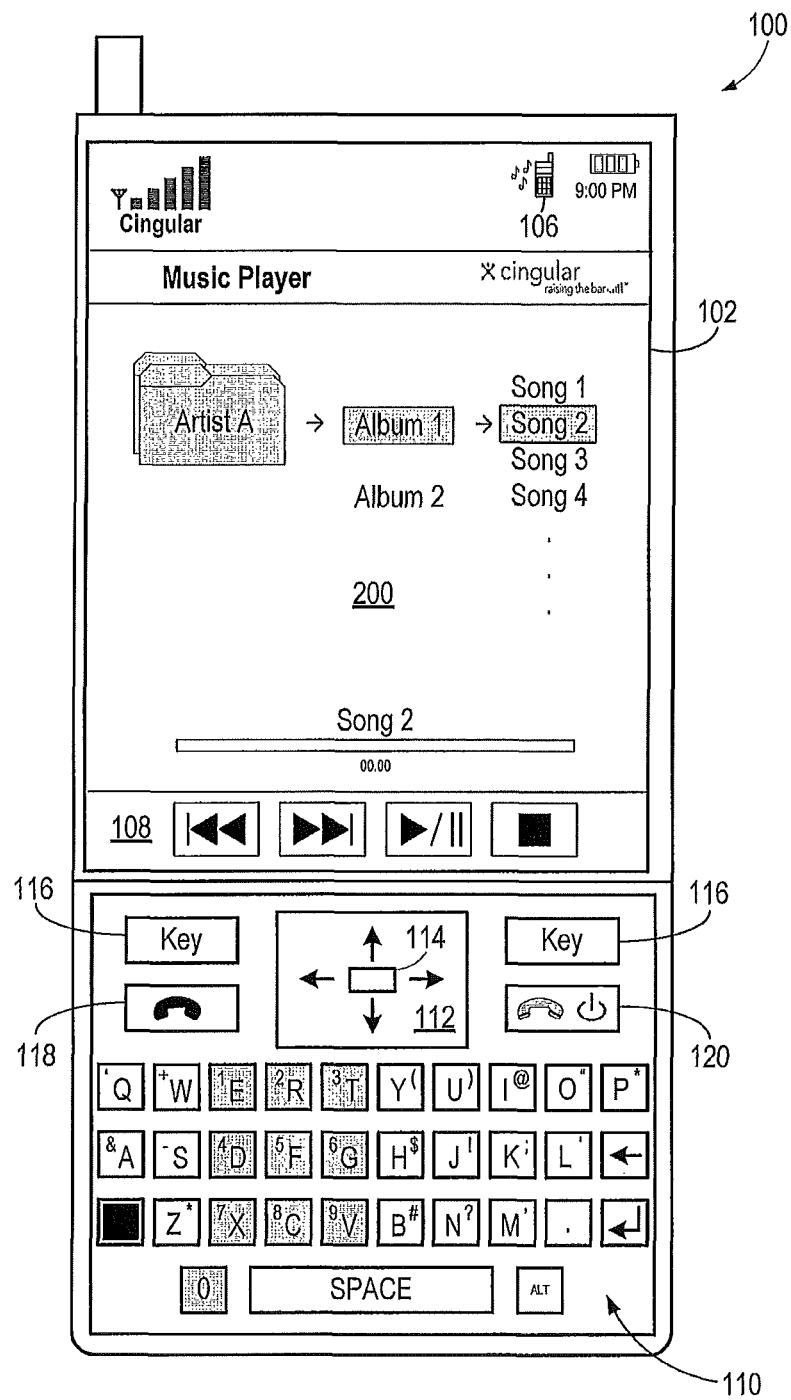
Figure 3:
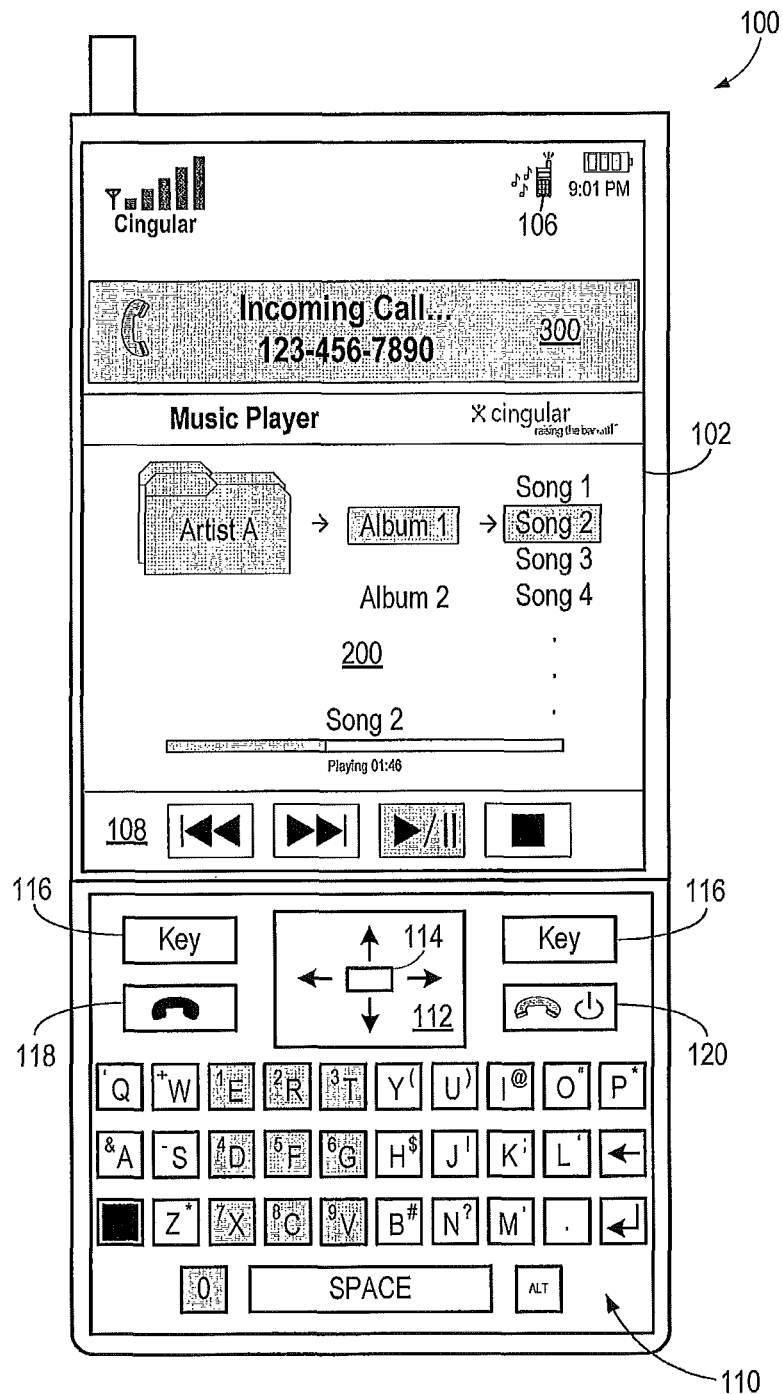

The mobile device status icon 106 is used to notify a user of the current device mode of the hybrid mobile device 100. The mobile device status icon 106 as illustrated in FIG. 1 indicates to the user that the hybrid mobile device is presently in a telecommunications-only device mode. Other mobile device status icons 106 may be utilized to identify other device modes, such as an entertainment-only device mode and a hybrid telecommunication and entertainment device mode as shown in FIG. 2 and FIG. 3, respectively. It should be understood, however, that alternative mobile device status icons 106 may be utilized to identify the mode status of the hybrid mobile device 100 for any alternative embodiments that may arise from implementing the present invention.

The illustrated number entry screen 104 can include a prompt for the user to input a telephone number. Additional or alternative screens associated with the operation of the hybrid mobile device 100 in telecommunications-only mode may also be presented to the user on the display 102.

The illustrated soft key menu 108 includes a DELETE soft key and a STORE soft key. The soft key menu 108 may change to provide appropriate functionality for the present screen, as will be shown in subsequent figures. The hybrid mobile device 100 further includes various hard keys. A hard keypad 110 includes letters arranged in a typical QWERTY layout; however, other keypad/keyboard layouts are contemplated. Other characters such as numbers and punctuation may be accessed through the ALT key or another key(s) assigned similar functionality. Hard keys 116 correspond to the soft keys shown in the soft key menu 108. A terminate call key 118 and an initiate call/power key 120 are shown on either side of directional pad 112. The directional pad 112 includes a directional pad key 114. The directional pad 112 and the directional pad key 114 are functional to select various items that are presented on display 102. Further functionality of the various hard keys described above will not be discussed as it is known to those of ordinary skill in the art.

Referring now to FIG. 2, the hybrid mobile device 100 is shown in an entertainment-only device mode as indicated by the mobile device status icon 106. It should be understood that the illustrated mobile device 100 is used to describe a music control profile, however, other media control profiles are contemplated such as, but not limited to, still image, video, or combinations thereof. Although the entertainment-only device is not currently functional as a telecommunications device a strength of signal graphic is still shown on the display 102. This and other pertinent telecommunications data may or may not be displayed on the hybrid mobile device 100 when in the entertainment-only device mode. Likewise, other modes may or may not include information that is not necessarily relevant to the current mode status. It is contemplated that these and like display settings can be selected and/or configurable by a user and stored in a media control profile.

A music player screen 200 is depicted on display 102. The illustrated music player screen 200 includes an exemplary music file structure. The file structure and the means for accessing one or more media files may be any known to those skilled in the art. The illustrated music player screen 200 further includes a time lapse bar (positioned at time 00:00) and an indication of the selected song (i.e., Artist A/Album 1/Song 2). These elements may also be any type known to those skilled in the art. Further functional elements or non-functional elements used to enhance a user's interactive experience may also be incorporated into the music player screen 200 and may be made available to the user via selectable settings that can be stored in the media control profile.

The soft key menu 108 has changed to a music file manipulation menu, wherein a rewind key, a fast forward key, a play/pause key, and a stop key are illustrated. These soft keys are selected by any of the above described hard keys or by other means for selection such as, but not limited to, a scroll wheel or a touchscreen. Further, the keys shown in the music file manipulation menu perform the typical functions. Other keys, not shown, may also be incorporated into the music file manipulation menu such as a record key, slow key, and the like.

The music file format type used by the music player can be any type known to those skilled in the art such as, but is not limited to, Advanced Audio Coding (AAC), Apple® Lossless Encoder (ALE)/Apple® Lossless Audio Codec (ALAC), Audio Interchange File Format (AIFF), Moving Picture Experts Group (MPEG) Audio Layer 3 (MP3), WAVeform audio format (WAV), Free Lossless Audio Codec (FLAC), True Audio (TTA), AA, Advanced AA, and the like. Alternatively, for embodiments in which other media is used any appropriate file format may be used.

Referring now to FIG. 3, the hybrid mobile device 100 is shown in a hybrid telecommunications and entertainment mode as indicated by the mobile device status icon 106. This mode as with the telecommunications-only and entertainment-only modes may be enabled via a setting of the media control profile. Further, the profile may be changed on-the-fly by the user or by the network. By way of example and not limitation, the network may change the profile so the hybrid mobile device 100 is capable of receiving an emergency signal such as an Emergency Alert Service (EAS) message.

Various selectable settings for these and other scenarios may be provided to the user. Alternatively or in addition, the hybrid mobile device 100 may support user defined settings. Dynamic software stored in a memory of the hybrid mobile device 100 may be developed to support these settings. The hybrid mobile device 100 as illustrated in FIG. 3 depicts an incoming call notification 300 and the other elements described with reference to FIG. 1 and FIG. 2. The file manipulation menu has changed to reflect the selection of the play/pause key, as indicated by the shaded play/pause key. The time lapse bar has been changed to indicate the file manipulation status (i.e., playing) and the time (i.e., 01:46).

Figure 7:
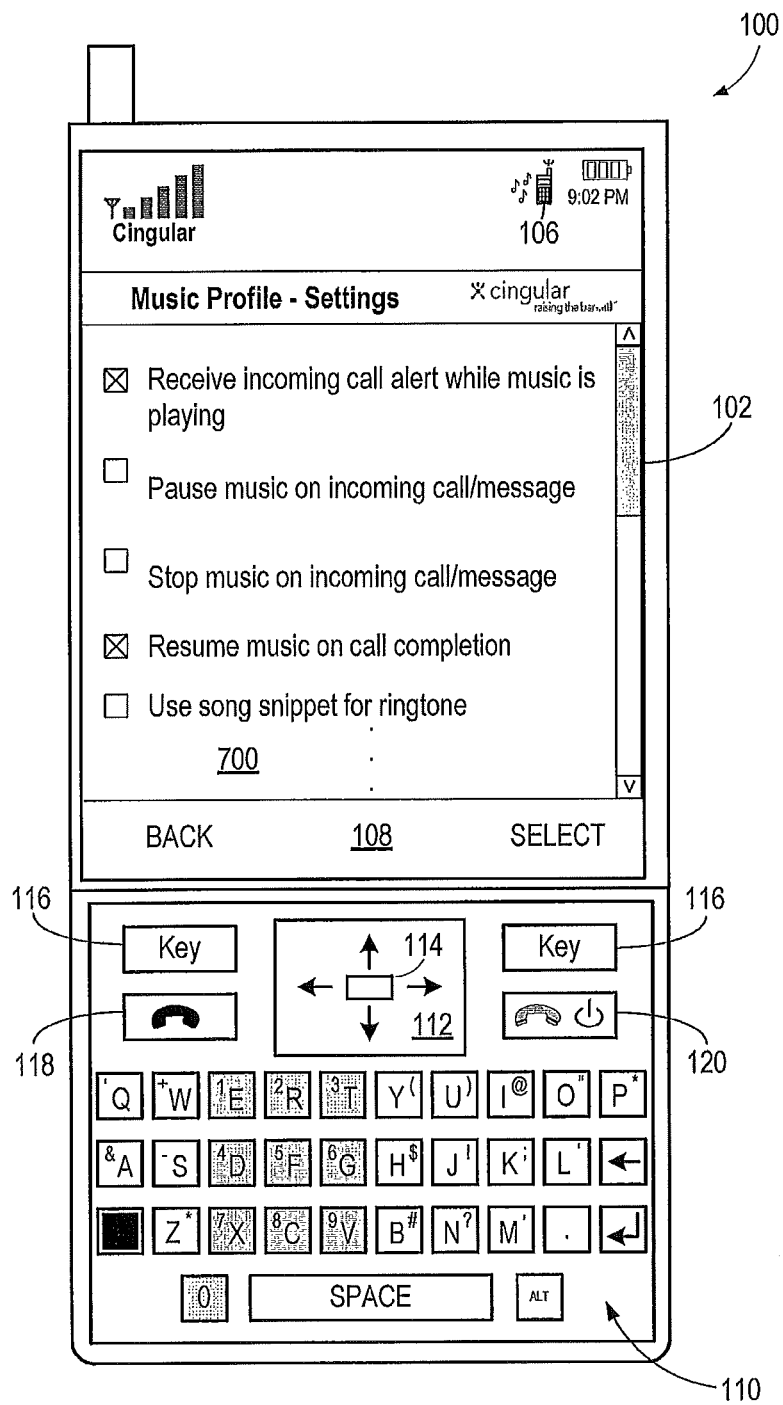

As illustrated, the incoming call notification 300 is displayed in addition to the media currently being presented to the user, which in this case is song 2. The incoming call notification 300 may be presented to the user as a visual notification as shown and/or as an audible notification. The audible notification may be played concurrently with the music file or other media file that is presently being played on the hybrid mobile device 100. The audible notification may also be played while the music file or other media file is paused. The audible notification may further be played after the music file or other media file is stopped. Further notifications and/or alerts may be utilized, for example, a vibration alert. These and other settings may be selectable via a menu system on the hybrid mobile device as best shown in FIG. 7 or via a web interface. An exemplary music profile settings screen 700 and an exemplary web interface (not illustrated) are described in greater detail with respect to FIG. 7.

Figure 4:
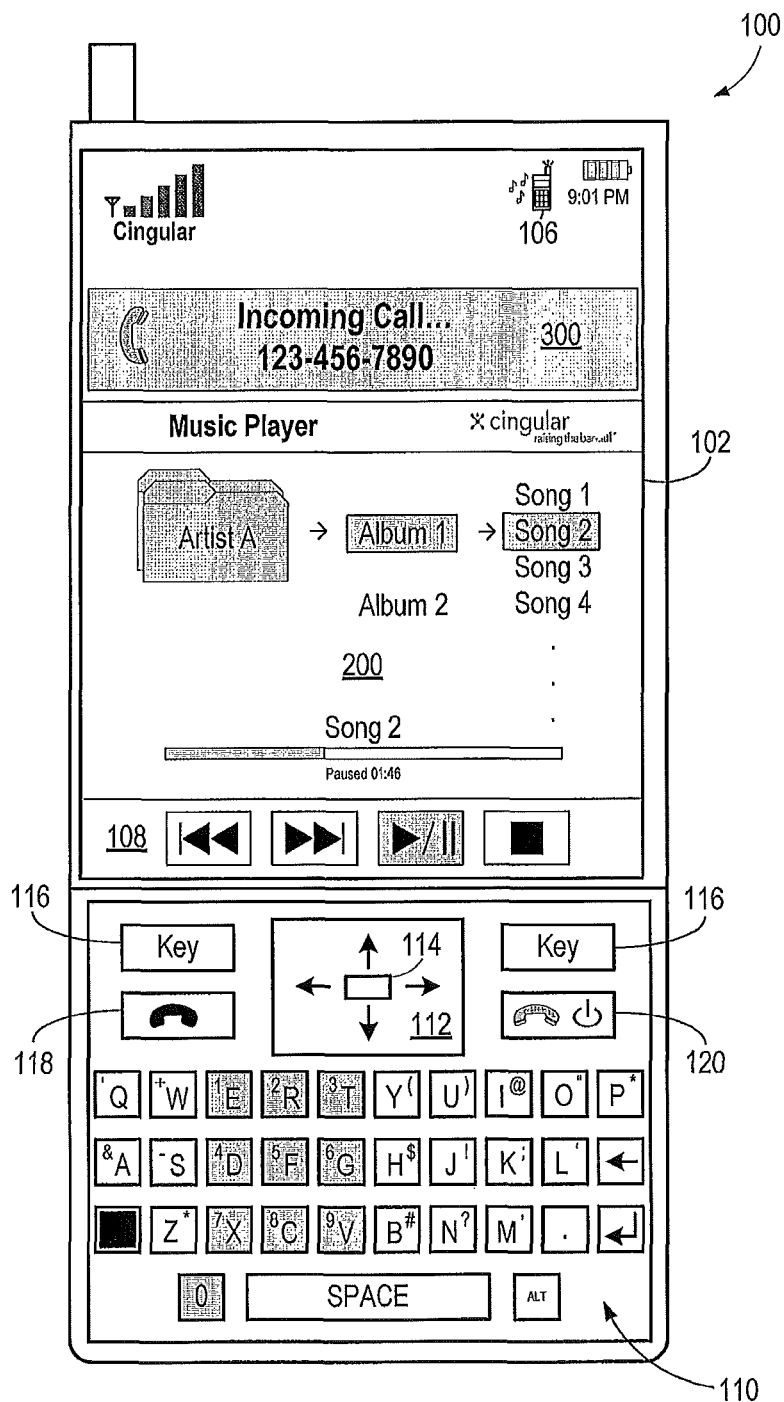

Referring now to FIG. 4, the hybrid mobile device 100 is shown in a hybrid telecommunications and entertainment mode as indicated by the mobile device status icon 106. The elements illustrated in FIG. 3 are also shown in FIG. 4 with the exception of Song 2 being in a paused state as indicated beneath the time lapse bar. The play/pause key is also shaded to indicate such a state. The color and/or degree of shading may be changed to differentiate a play state versus a pause state. This is an exemplary embodiment of hybrid mobile device 100 with an enabled profile setting for pausing music or other media upon receipt of an incoming call and/or message.

Figure 5:
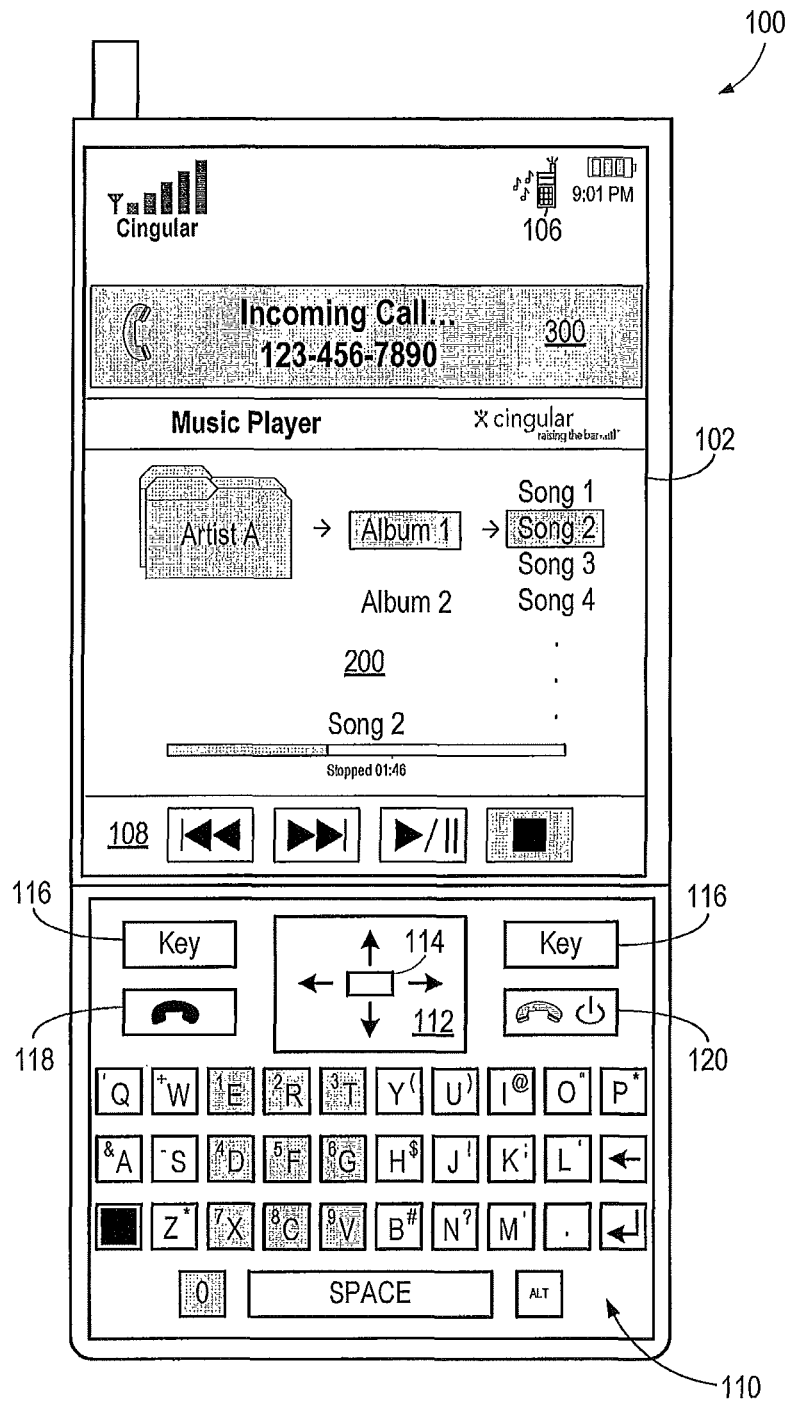

FIG. 5 depicts an exemplary embodiment of the hybrid mobile device 100 in a hybrid telecommunications and entertainment mode as indicated by the mobile device icon 106. Further, a profile setting for stopping music or other media upon receipt of an incoming call and/or message is enabled. As illustrated, Song 2 is in a stopped state as indicated in the soft key menu 108 by the shaded stop key.

It is contemplated that a ringtone or other notification may be used to additionally notify the user that there is an incoming call.

Figure 6:
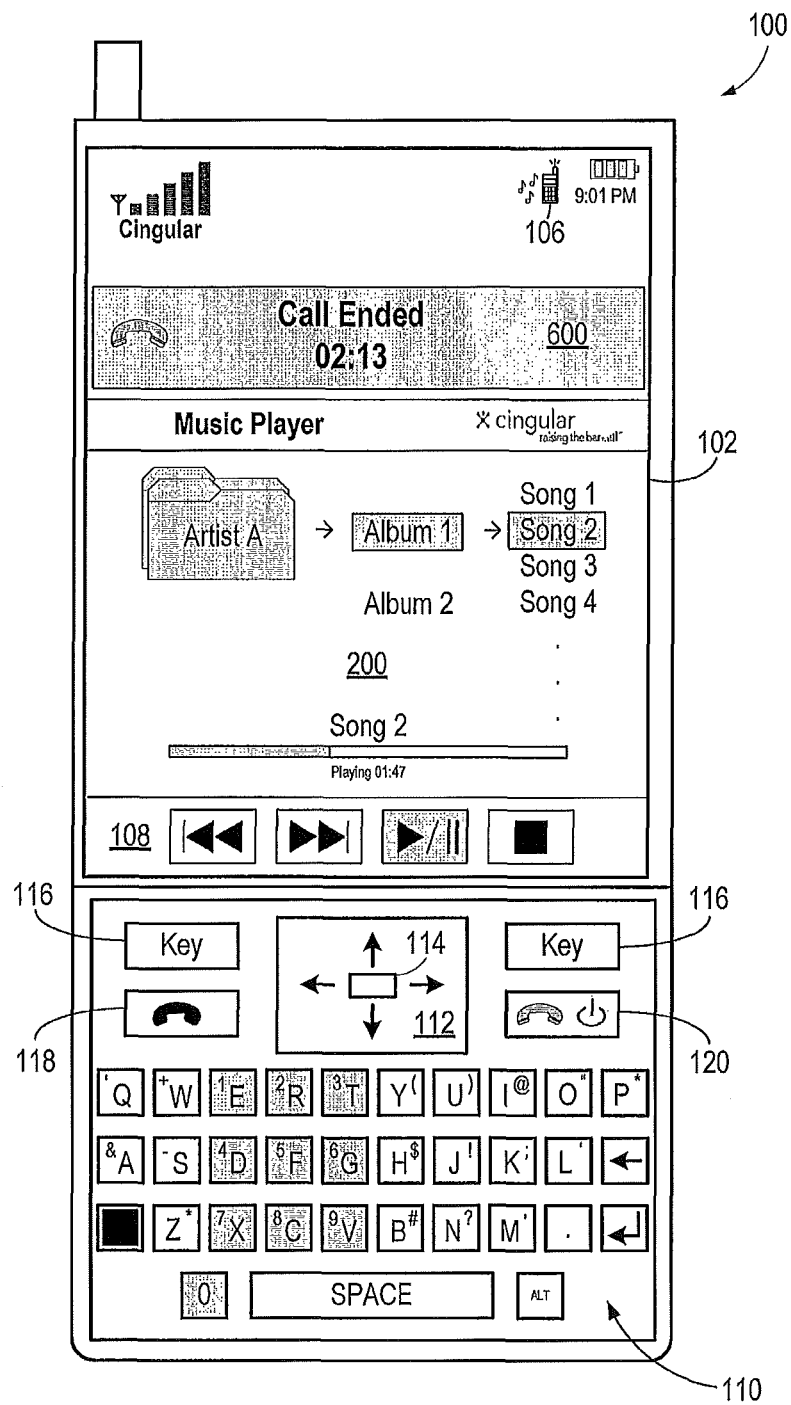

Referring now to FIG. 6, the hybrid mobile device 100 is shown in a hybrid telecommunications and entertainment mode as indicated by the mobile device status icon 106. Provided by FIG. 6 is an exemplary embodiment of a profile setting to resume an indicated operation (e.g., play, pause, stop) upon call completion. As illustrated, a completed call notification 600 is presented on display 102. Like the incoming call notification 300, the completed call notification may include a visual notification and/or an audible notification. Settings for selectable pre-defined operations such as play after call completion, pause after call completion, and stop after call completion may be provided as well as user-defined operations. In some embodiments, these settings may be supplemented with secondary, tertiary, or higher degree settings. For example, a user has selected a primary setting to resume an indicated operation (e.g., play) and has also selected a secondary setting to be prompted before resuming the indicated operation, thus after call completion a prompt may be presented to the user in an audible and/or visual format and the user would provide an appropriate response. Alternatively, the initial setting may include all limitations such that one setting is configured to automatically resume, whereas another may prompt the user for a response prior to resuming operation. These higher degree settings may be applicable to individual settings and/or groups of settings. Further, higher degree settings may be incorporated for any media control profile setting. Moreover, these higher degree settings may be pre-defined or user-defined.

Referring now to FIG. 7, the hybrid mobile device 100 is shown in a hybrid telecommunications and entertainment device mode as indicated by the mobile device status icon 106. An exemplary music control profile settings screen 700 is illustrated on display 102. The illustrated music control profile settings screen 700 includes selectable settings to receive an incoming call/message notification/alert while music is playing, to pause music on an incoming call/message, to stop music on an incoming call/message, to resume music on call completion, and to use a song snippet for a ringtone. These settings with the exception of the setting to use a song snippet for a ringtone have already been described. The song snippet setting is described below with reference to FIG. 8 and FIG. 9.

With continued reference to FIG. 7, the music control profile setting screen 700 can include a number of selectable primary profile settings as illustrated. The music control profile setting screen 700 can further include a number of secondary or higher degree setting (not shown) as previously described. Although not shown, the music control profile setting screen 700 may include a button or other means to access and/or input a new user-defined primary setting, secondary setting, and/or higher degree setting. Software may be developed to provide varying levels of user customizable settings. Certain devices and/or subscribers may only have a few selectable settings and/or options whereas others may have more selectable settings and/or options and potentially the ability to define and/or customize the settings and/or options stored in one or more music or other media control profiles.

Additionally or alternatively, a user may be provided a web interface (not shown) to perform operations similar to those available from the music profile settings screen 700 and optionally other operations not available from the hybrid mobile device 100. These other operations may be excluded from the hybrid mobile device 100 interface due to hardware, software, or other limitations that prevent these operations from being made available on the hybrid mobile device 100. Further, due to the relatively small keypads and other input means associated with certain types and styles of mobile devices, the web interface may offer a more flexible and easier to use interface for users of these devices. The web interface may utilize any programming language known to those skilled in the art.

Figure 8:
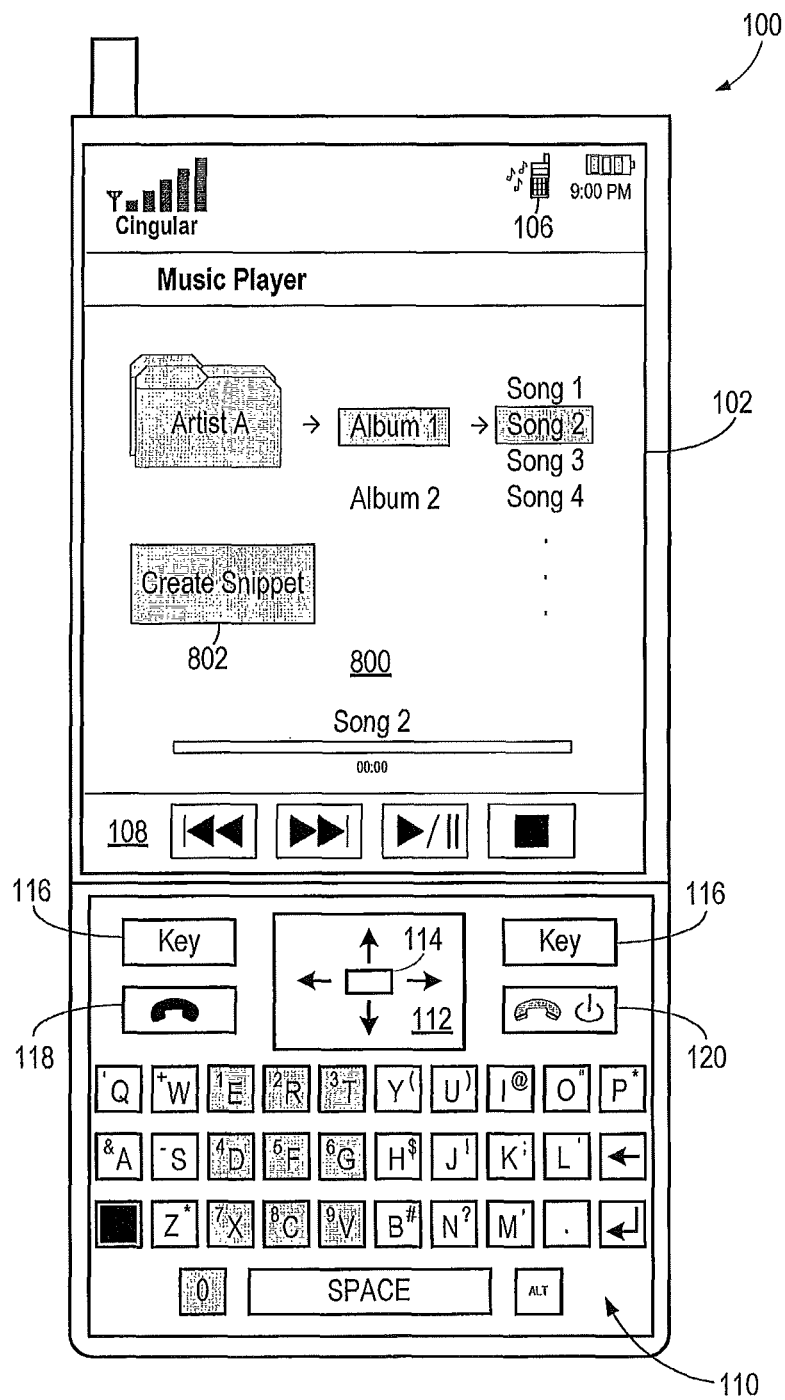

Referring now to FIG. 8, the hybrid mobile device 100 is shown in an entertainment-only device mode as indicated by the mobile device status icon 106. An exemplary music player screen 800 is presented on display 102. The exemplary music player screen 800 includes the elements of the music player screen 200 with the addition of a create snippet button 802. The create snippet button can be used to manually create a snippet from a music file stored on the hybrid mobile device 100. A snippet can also be created automatically. Settings for automatic snippet creation can include suggestive settings that utilize the most popular, least popular, most recently played, or least recently played media file to create a snippet. These settings can be associated with specific media control profiles.

Alternative embodiments for the acquisition or creation of a media snippet, in particular, a ringtone are now described. It should be understood that the following description is also applicable to other media types including, but not limited to, still images, video, or combinations thereof.

In one embodiment, a music file, including an encryption scheme is provided. The encryption scheme allows for the creation of one or more ringtones from an encrypted music file. This effectively prevents users from creating ringtones from music files that are not encrypted.

An encryption scheme can be open or pre-defined. An open encryption scheme would allow for manual or automatic creation of a ringtone. For example, a user could manually create a ringtone utilizing the create snippet features described above with reference to FIG. 8. Alternatively, the hybrid mobile device 100 may use an algorithm to randomly select a portion of the music file from which to create a ringtone. Conversely, a pre-defined encryption scheme would allow for manual or automatic creation of a ringtone and limit the ringtone to pre-defined sections of the music file; for example, a guitar riff or chorus.

In another embodiment, a ringtone is created based upon a time-shifting process performed on the hybrid mobile device. The time-shifting process can randomly select begin and end points of a music file and play the selected portion as a ringtone.

In yet another embodiment, a user can acquire a ringtone creation file specific to a particular music file. This can be acquired, for example, from a third party such as an online community or a first party such as a music store/website. The ringtone creation file would be instructed to create one or more ringtones based upon pre-defined points in the music file. These pre-defined points can be based upon time or an analysis of the acoustic characteristics of the music file.

Figure 9:
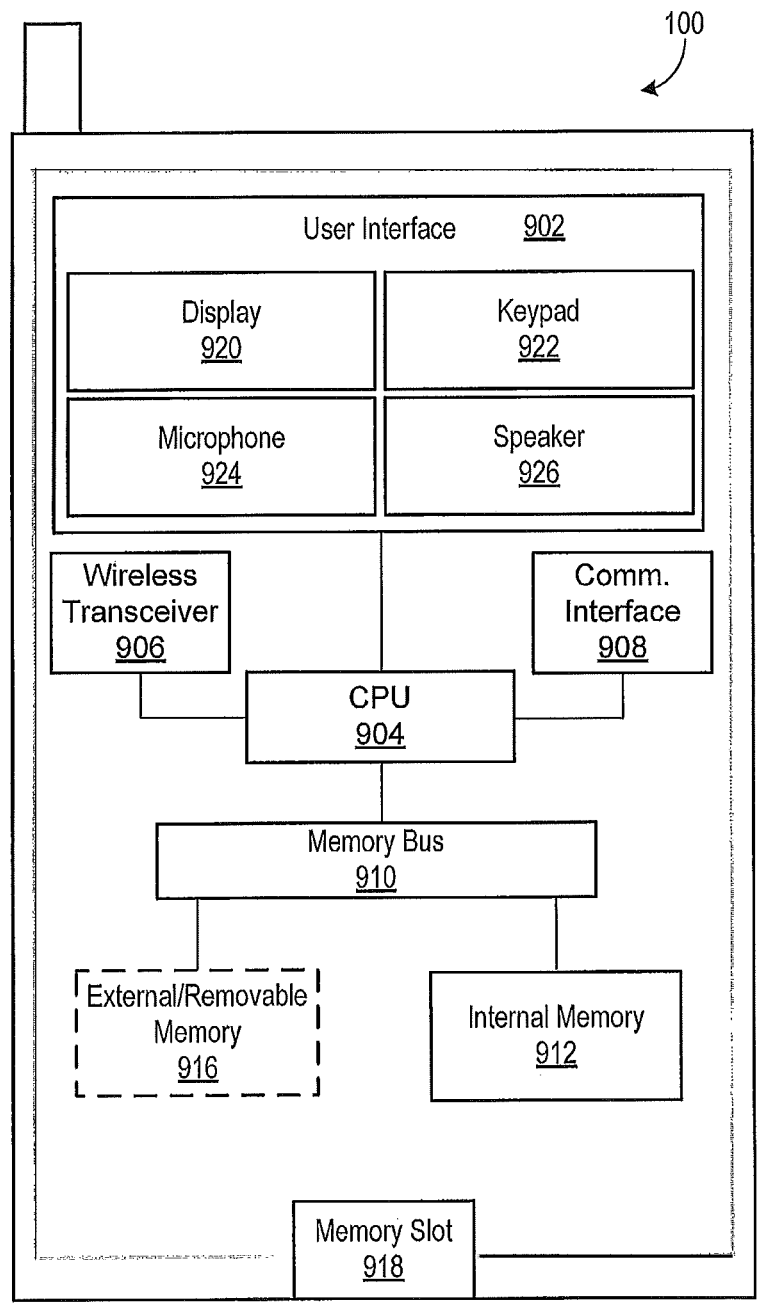
FIG. 9 illustrates exemplary components of a hybrid mobile device, according to the present invention.

Referring now to FIG. 9, an exemplary hybrid mobile device 100 and its components are shown. The illustrated hybrid mobile device 100 includes a user interface 902 operatively linked to a central processing unit (CPU) 904, which in turn is operatively linked to a wireless transceiver 906, a communications interface 908, and a memory bus 910. The memory bus 910 is operatively linked to both an internal device readable memory 912 and an external/removable memory 916. The hybrid mobile device 100 is also configured with a memory slot 918 so that external/removable memory 916 may be removably inserted into hybrid mobile device 100.

The illustrated user interface 902 includes a display 920, a keypad 922, a microphone 924, and a speaker 926. The display 920 can be any type such as, but not limited to, liquid crystal display (LCD), light emitting diode (LED), thin-film transistor (TFT), and the like. The keypad 922 can comprise any number of keys and the keys can be constructed from any type of material and can be any shape, size, color, and texture. The microphone 924 and the speaker 926 can be any type known to those skilled in the art.

The CPU 904 and memory bus 910 should be sufficient to handle the additional processing and memory storage duties associated with implementing the present invention. The CPU 904 and memory bus 910 architectures can be any type known to those skilled in the art, and the corresponding memory types used by the internal memory 912 and the external/removable memory 916 can be, for example, a read-only memory (ROM), a random access memory (RAM), and/or a hybrid of ROM and RAM.

Figure 10:
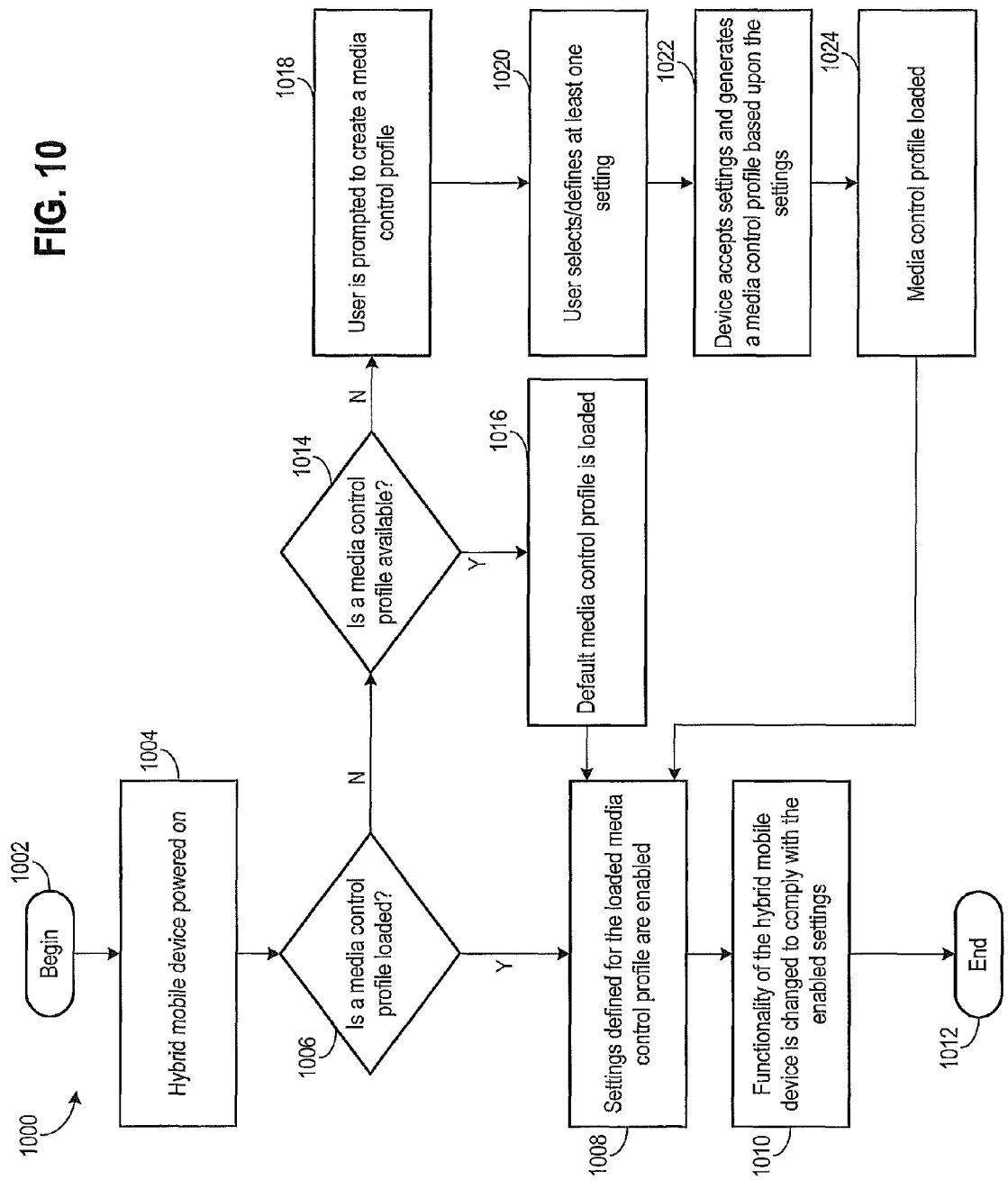
FIG. 10 illustrates an exemplary method for managing media control profiles, according to the present invention.

Referring now to FIG. 10, an exemplary method 1000 for acquiring and loading a media control profile from a memory 912, 916, according to the present invention is illustrated. It should be understood that the steps illustrated with regard to FIG. 10 are not limited to the order shown.

The exemplary method 1000 begins at step 1002 and proceeds to step 1004 where the hybrid mobile device 100 is powered on. At decision step 1006, it is determined if a media control profile is loaded. If a media control profile is loaded, at step 1008 the appropriate settings for the media control profile are enabled. The functionality of the hybrid mobile device 100 is changed at step 1010 to comply with the enabled settings. At step 1012, the method ends.

If it is determined, at step 1006, that a media control profile is not loaded, the method 1000 proceeds to decision step 1014 wherein it is determined if a media control profile is available. If it is determined that a media control profile is available, a default media control profile is loaded, at step 1016. It is contemplated that the default media control profile can be set to default by the manufacturer, a vendor, or can be defined by the user. The method 1000 then proceeds to step 1008 wherein the appropriate settings for the default media control profile are enabled. The functionality of the hybrid mobile device 100 is changed at step 1010 to comply with the enabled settings. At step 1012, the method ends.

If it is determined, at step 1014, that a media control profile is not available, then the user is prompted to create a media control profile, at step 1018. At step 1020, the user selects/defines at least one setting to be enabled for the new media control profile. At step 1022, the hybrid mobile device 100 accepts the settings and generates a media control profile based upon the new settings. At step 1024, the new media control profile is loaded. Alternatively, a user may select not to load the media control profile and/or create another media control profile. The method 1000 then proceeds to step 1008 wherein the appropriate settings for the new media control profile are enabled. The functionality of the hybrid mobile device 100 is changed at step 1010 to comply with the enabled settings. At step 1012, the method ends.

Figure 11:
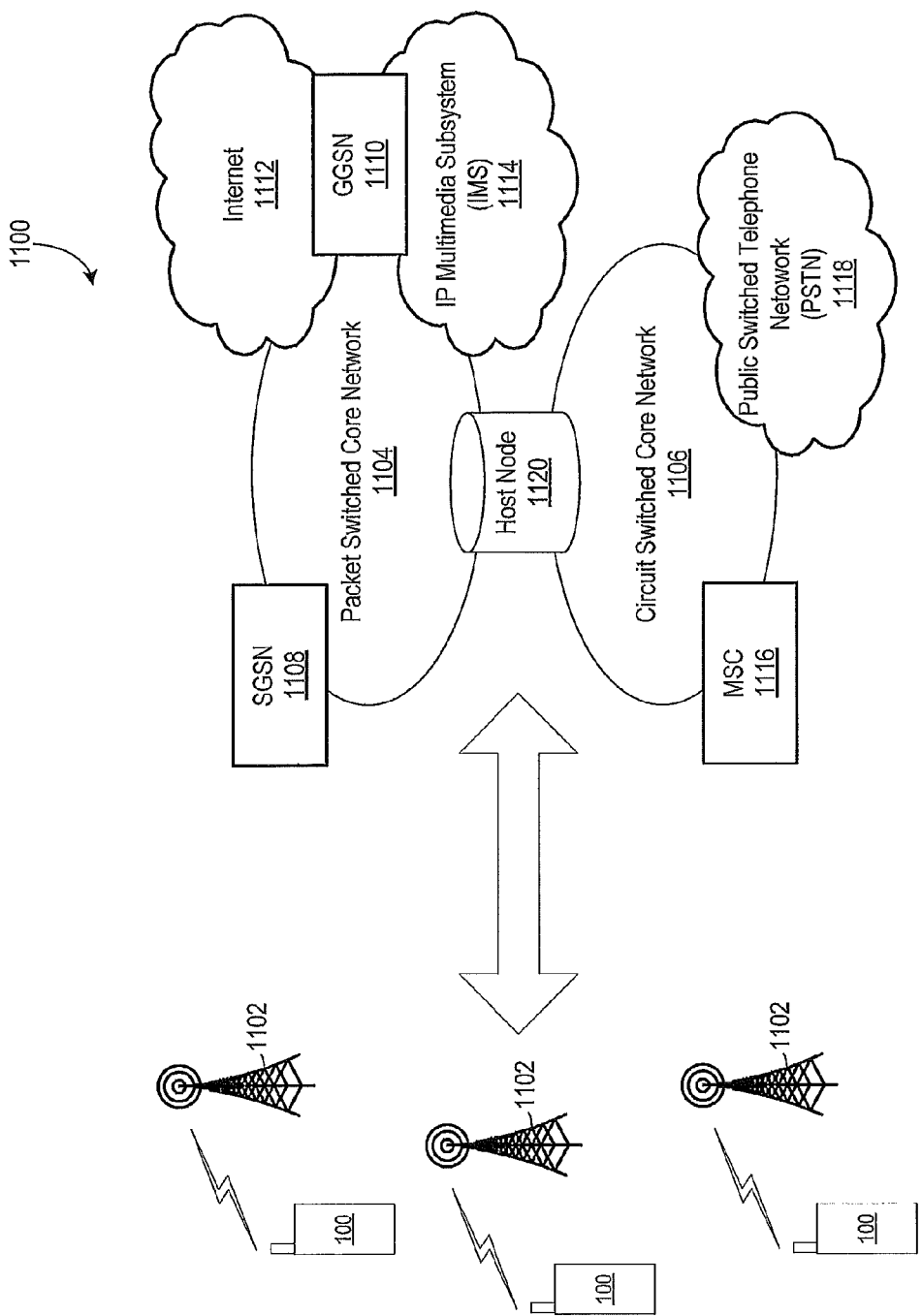
FIG. 11 illustrates an exemplary communications system, according to the present invention.

Referring now to FIG. 11, a communications system 1100 is illustrated, according to the present invention. The communications system 1100 can be used to offer network-based media control profiles. The above-mentioned embodiments all include one or more media control profiles stored in a memory of the hybrid mobile device 100. In the embodiment described with reference to FIG. 11, the media control profile is stored in a host node 1120 and is accessed by the hybrid mobile device 100 via any means for wireless communication.

The illustrated communications system 1100 includes hybrid mobile devices 100 in communication with Radio Access Networks (RAN) 1102. The RANs 1102 may utilize any means for wireless communication. The communications system 1100 is divided into two main core networks, namely a packet switched core network 1104 and a circuit switched core network 1106.

The illustrated packet switched core network 1104 includes a Serving General Packet Radio Service (GPRS) Support Node (SGSN) 1108 that allows access by each of the hybrid mobile devices 100 to the packet switched core network 1104 via their respective RANs 1102. The packet switched core network 1104 further includes a Gateway GPRS Support Node (GGSN) 1110 that facilitates access to the Internet 1112 and an Internet Protocol Multimedia Subsystem (IMS) 1114. The illustrated circuit switched core network 1106 includes a Mobile Switching Center (MSC) 1116 that facilitates access from the RANs 1102 to the circuit switched core network 1106 and the Public Switched Telephone Network (PSTN) 1118.

The circuit switched core network 1106 and the packet switched core network 1104 are both in communication with a host node 1120. The host node 1120 can be, for example, a database such as an analytic database, an operational database, a hierarchical database, a network database, or any combination thereof. The host node 1120 can be configured to store media control profiles and the associated settings for a plurality of hybrid mobile devices 100. The host node 1120 can be further configured to store music files, ringtones, and/or other media files. The data stored in the host node 1120 can be sent to a hybrid mobile device 100 based upon a request from the hybrid mobile device 100, automatically sent to the hybrid mobile device 100 during pre-determined update intervals, or upon a request from another network node.

The communications system 1100 may also provide streaming media such as streaming audio and video to the hybrid mobile devices 100 for use in accordance with settings of a media control profile. Streaming media may be used to notify a user of an incoming call. In addition, streaming media may be presented to the calling party if the calling party is placed on hold. Other applications are contemplated.

Figure 12:
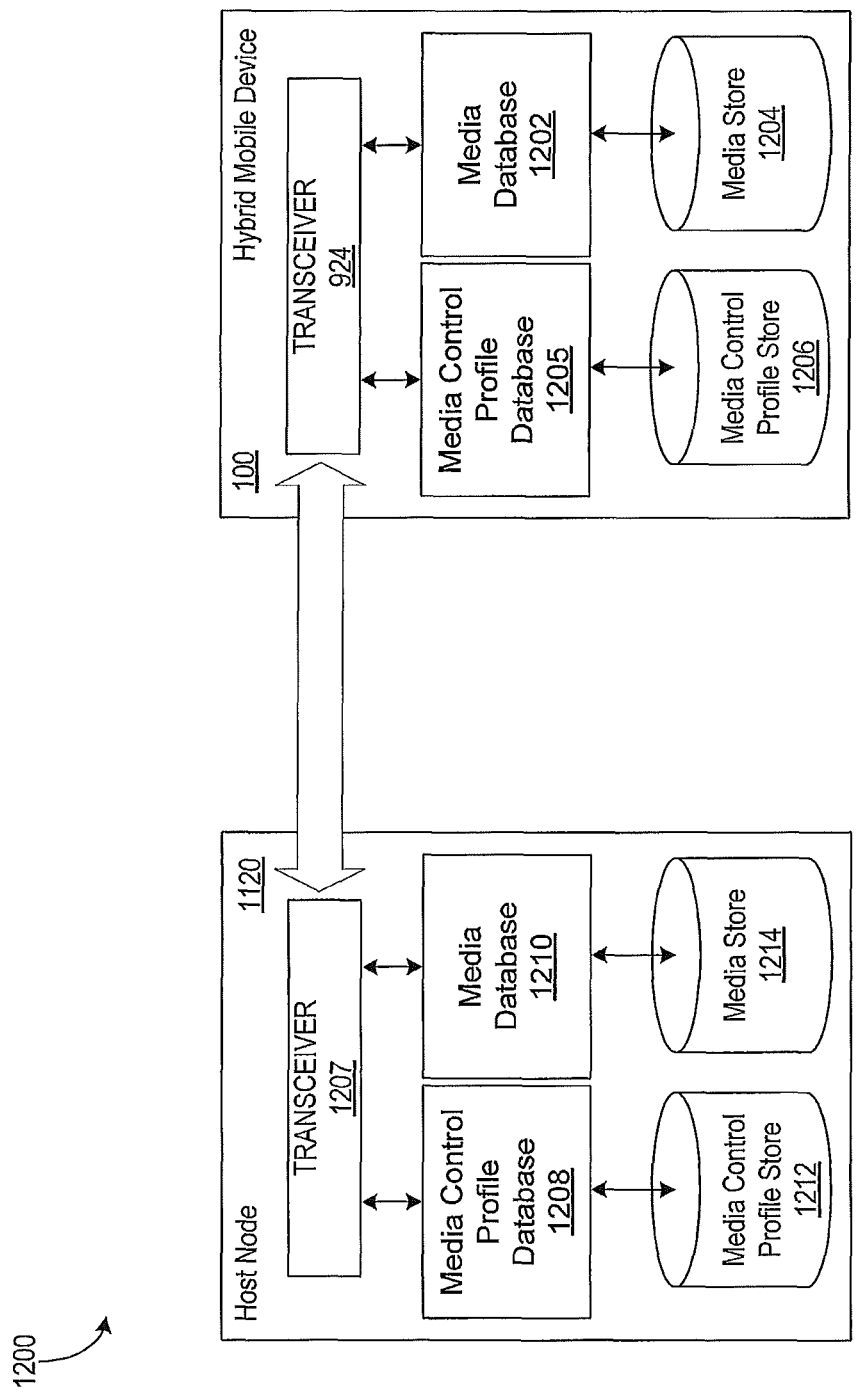
FIG. 12 illustrates a media control profile management system, according to the present invention.

FIG. 12 is a block diagram of a media control profile management system 1200, according to the present invention. The illustrated media control profile management system 1200 includes a host node 1120 and a hybrid mobile device 100 in communication via their respective transceivers 1207, 906. In particular, the hybrid mobile device 100 includes a media database 1202 that is in communication with a media store 1204. The media database 1202 and the media store 1204 can be stored in a memory, for example, internal memory 912 and/or external memory 916. The media database 1202 is configured to store information such as attributes and characteristics of the media items that are stored in the media store 1204. For example, in the case of audio and video media, the information can include one or more of: title, album, track, artist, composer, genre, ringtone capabilities, and the like. The media store 1204 is configured to store various media items such as, but not limited to, audio, video, and image files or combinations thereof.

The hybrid mobile device 100 further includes a media control profile database 1205 that is configured to store media control profile information associated with media control profiles stored in a media control profile store 1206. This information can include, but is not limited to, the profile owner (i.e., the subscriber associated with the profile), profile type, profile size (i.e., the number of settings), and other attributes or characteristics of each profile stored in the media control profile store 1206.

The media control profile store 1206 is configured to store the actual media control profiles. That is, a group of settings designated as a profile. The media control profiles may be generated by a subscriber and stored in the media control profile store 1206. These media control profiles can be available only to the subscriber and optionally additional subscribers as designated by the profile owner. The media control profiles may also be generic media control profiles that are accessible by any or specific subscribers.

The illustrated host node 1120 includes a media control profile database 1208 and a media database 1210 that are operatively linked to their respective stores 1212, 1214. The media control profile database 1208, media database 1210, the media control profile store 1212, and the media store 1214 are configured substantially similar to their counterparts in the hybrid mobile device 100, although the capacity is increased to facilitate network users.

The media control profiles, generic or otherwise, are accessible by the hybrid mobile device 100 and transmitted from the host node transceiver 1207 to the hybrid mobile device transceiver 906 via any means for wireless communication used by the host network.

Figure 13:
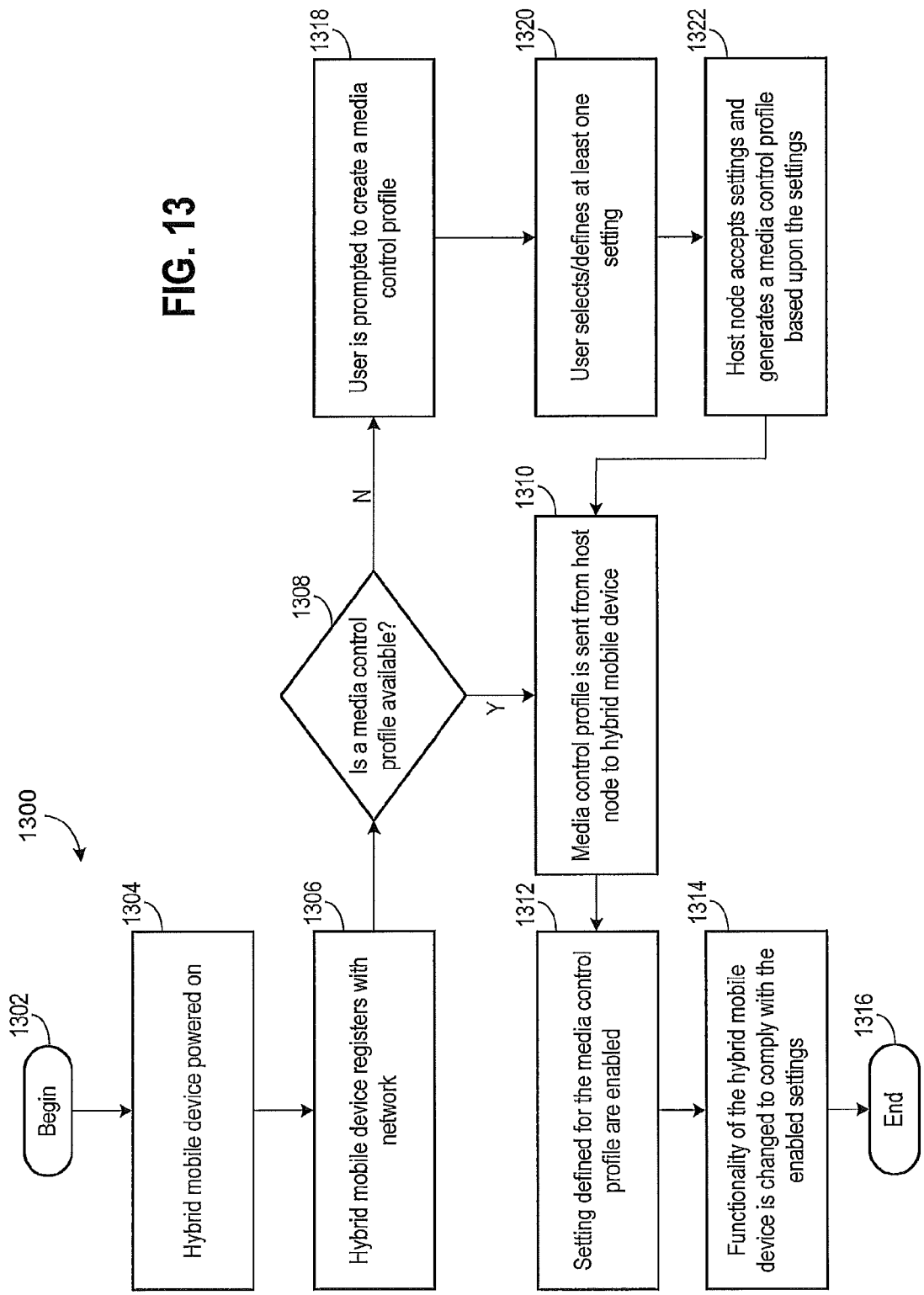
FIG. 13 illustrates an exemplary method for managing media control profile via a host node, according to the present invention.

Referring now to FIG. 13, an exemplary method 1300 for acquiring and loading a media control profile from a network is shown, according to the present invention. It should be understood that the steps illustrated with regard to FIG. 13 are not limited to the order shown.

The exemplary method 1300 begins at step 1302 and proceeds to step 1304 where the hybrid mobile device 100 is powered on. The hybrid mobile device 100 then registers with the host network in step 1306 via registration methods known to those skilled in the art. At decision step 1308, it is determined if a media control profile is available. In one embodiment, the hybrid mobile device 100 sends a query to the host node 1120. The host node 1120 receives the query and determines if there is a media control profile available for the requesting subscriber. If a media control profile is available, then the media control profile is sent from the host node 1120 to the hybrid mobile device 100 at step 1310. At step 1312, the settings as prescribed the media control profile are enabled. The functionality of the hybrid mobile device is changed to comply with the enabled settings at step 1314. The method 1300 then proceeds to step 1316 and the method 1300 ends.

In alternative embodiments wherein there is more than one media control profile available, the host node 1120 can respond to the hybrid mobile device 100 query by sending a query response. The query response may include a prompt to inform the requesting subscriber that multiple media control profiles were found. The prompt may be configured to receive a selection of a media control profile and the selection may be sent back to the host node 1120. The method 1300 then continues at step 1310 as previously described.

If at step 1308 a media control profile is not available, then the method 1300 proceeds to step 1318 wherein the subscriber is prompted to create a media control profile. At step 1320, the subscriber may be presented with an interface screen (not shown) to select and/or define at least one setting to create a media control profile. The interface screen may be provided on a display of the hybrid mobile device 100 or may be accessible via a web page. Other means for acquiring setting selections and/or definitions may used such as, but not limited to, a voice recognition system accessible via a telephone number.

The settings are sent to the host node 1120 at step 1322. The host node 1120 may confirm that there are no conflicts with the received settings. Alternatively, the interface screen or other means for acquiring settings may perform a similar function. The host node 1120 then generates a media control profile based upon the received settings. The method 1300 then proceeds to step 1310 and the method 1300 proceeds thereafter as previously described. In further embodiments, a number of generic media control profiles may be made available through the host node 1120. These media control profiles may be downloadable to the hybrid mobile device 100 regardless of the subscriber. Further, a generic or other media control profile may be tagged as the default media control profile and thus may be automatically sent to the hybrid mobile device 100 upon registration with the network.

In still further embodiments, a media control profile selection screen may be provided on a display of the hybrid mobile device 100. The selection screen may be configured to allow selection by a user of a media control profile. This selection is then sent to the host node 1120 in a query. The host node 1120 may then determine if the requested media control profile is available for the requesting subscriber. If the requested media control profile is available, the method 1300 is implemented.

Additional Media Control Profile Settings

In addition to the settings described above with reference to the various figures, the following settings may be incorporated into a media control profile. For embodiments in which an audible notification such as a ringtone is used, settings may be provided such that when selected the music or other media being played on the hybrid mobile device 100 may continue to play with the ringtone that is assigned for the calling party and at a volume designated by the user for the calling party or for any calls and/or message received regardless of the calling/messaging party. In similar embodiments, settings may be provided such that the volume of the music or other media being played on the hybrid mobile device 100 may be muted, decreased, or increased while playing the appropriate ringtone at a specified volume.

Further settings may be provided that allow a user to send all calls directly to voicemail while a music or other media file is being played. Once selected and enabled, this setting may utilize a send-all-calls feature that is selectable to send all calls to a voicemail server on the serving communications network. The send-all-calls setting may alternatively direct all calls to a different device. In other embodiments, priority calls such as emergency calls may supersede the send-all-calls setting so that the user does not unnecessarily miss an important call. Likewise, certain calling party numbers can be entered or selected from a contact list to be designated as allowed callers. For example, a user may have loaded a media control profile that has the basic settings to switch the hybrid mobile device 100 to an entertainment-only device. This would typically prevent any caller from reaching the user (called party). However, if the calling party is indicated as an allowed caller, then the loaded settings may be overridden to at least present a notification/alert to the called party to notify them of the identity of the calling party.

Other embodiments provide settings that manipulate the types of notifications/alerts the user wants to receive if the device is in a certain mode.

Further embodiments provide settings for loading a specified media control profile when the hybrid mobile device 100 is in a certain physical configuration. A flip style phone, for example, may be configured to enable a different media control profile for when the mobile device is in an open position and when the mobile device is in a closed position. The open position, for example, may cause the hybrid mobile device 100 to enable/load the media control profile that is associated with a telecommunications-only device mode or a hybrid telecommunications and entertainment device mode. Conversely, the closed position, for example, may cause the hybrid mobile device 100 to enable/load the media control profile that is associated with an entertainment device mode. A slide style mobile device and the like style mobile device may have similar functionality.

Still further embodiments may provide settings that are selectable for when the hybrid mobile device 100 is in communication with another device. For example, if the hybrid mobile device 100 is in a docking station, the hybrid mobile device 100 may enable/load a media control profile that is associated with an entertainment-only device mode. Moreover, other exemplary devices in communication with the hybrid mobile device 100 may include wireless or wired external speakers, wireless or wired headphones, BLUETOOTH enabled devices, infrared devices, IEEE 1394 devices, IEEE 802.11 devices, and the like. Various applicable settings may be associated with these devices.

Further embodiments may provide settings that are based upon the usage of the hybrid mobile device 100 at a given time. In these embodiments, the user may be utilizing certain programs or features of the hybrid mobile device 100 such as web browsing, instant messaging, other messaging, playing games, organizing calendar entries, entering and/or organizing TO DO list entries, or utilizing other program or features of the hybrid mobile device 100. General usage may enable/load a particular media control profile whereas specific program/feature use may enable/load the same or a different media control profile based upon a number of associated settings. The hybrid mobile device 100 usage may be monitored and analyzed to determine if the usage meets one or more requirements for a setting to be enabled.

Still further embodiments provide settings for allowing/disallowing music or other media to be played during an active call. This functionality may be induced automatically via a setting, automatically after user authentication via a prompt, after a specified time delay, or manually by the user via button selection. Moreover, the music can be played during the call over the voice path such that both the user and the other party are able to hear the music.

Further embodiments provide settings for playing a music file or other media file over the voice path from a user's current playlist, current song, or another playlist, while a call is placed on hold or is muted. A music file or other media file may begin or resume play on the hybrid mobile device 100 if the call is muted or placed on hold.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   determining, by an apparatus using a processor, that a setting of a media control profile associated with a mobile communication device is enabled; and
   directing, by the apparatus, in accord with the setting of the media control profile, a call intended for the mobile communication device to a voicemail system,
   wherein
   the setting is a call-routing setting;
   the media control profile further comprises a mode setting to control whether the mobile communication device is in an entertainment-only mode, a telecommunications-only mode, or a hybrid entertainment-and-telecommunications mode; and
   the call-routing setting is enabled when the mode setting is set to the entertainment-only mode.

2. The method of claim 1, further comprising determining, by the apparatus, that the call has been received.

3. The method of claim 2, wherein determining that the setting is enabled is performed in response to determining that the call has been received.

4. The method of claim 1, wherein directing the call to the voicemail system is performed:
   in response to determining that the call has been received;
   in response to determining that the setting of the media control profile is enabled; and
   if the setting is not overridden.

5. The method of claim 4, further comprising:
   determining that the call is from a pre-identified contact; and
   overriding the setting in response to determining that the call is from the pre-identified contact.

6. The method of claim 5, further comprising initiating, in response to (a) determining that the call has been received, (b) determining that the setting is enabled, and (c) overriding the setting, presenting, via the mobile communication device, a notification identifying the pre-identified contact.

7. The method of claim 5, further comprising directing the call for presentation via the mobile communication device in response to (i) determining that the call has been received, (ii) determining that the setting is enabled, and (iii) overriding the setting.

8. The method of claim 4, further comprising:
   determining that the call is a priority call; and
   overriding the setting in response to determining that the call is a priority call.

9. The method of claim 8, wherein the call is considered a priority call if the call is determined to be an emergency call.

10. The method of claim 8, further comprising initiating, in response to (a) determining that the call has been received, (b) determining that the setting is enabled, and (c) overriding the setting, presenting, via the mobile communication device, a notification identifying a calling party placing the priority call.

11. The method of claim 8, further comprising directing the call for presentation via the mobile communication device in response to (i) determining that the call has been received, (ii) determining that the setting is enabled, and (iii) overriding the setting.

12. A mobile communication device, comprising:
    a processor; and a computer-readable medium comprising instructions that, when executed by the processor, cause the processor to perform operations comprising:
  determining that a setting of a media control profile associated with the mobile communication device is enabled; and
  directing, in accord with the setting of the media control profile, a call intended for the mobile communication device to a different device.

13. The mobile communication device of claim 12, wherein directing the call to the different device is performed:
  in response to determining that the call has been received;
  in response to determining that the setting of the media control profile is enabled; and
  if the setting is not overridden.

14. The mobile communication device of claim 13, wherein the operations further comprise:
  determining that the call is from a pre-identified contact; and
  overriding the setting in response to determining that the call is from the pre-identified contact.

15. The mobile communication device of claim 13, wherein the operations further comprise:
  determining that the call is a priority call; and
  overriding the setting in response to determining that the call is a priority call.

16. A computer-readable storage device, on a mobile communication device having a processor, comprising computer-executable instructions that, when executed by the processor, cause the processor to perform operations comprising:
  determining that a setting of a media control profile associated with the mobile communication device is enabled; and
  directing, in accord with the setting of the media control profile, a call intended for the mobile communication device to a different device.

17. The computer-readable storage device of claim 16, wherein directing the call to the voicemail system is performed:
  in response to determining that the call has been received;
  in response to determining that the setting of the media control profile is enabled; and
  if the setting is not overridden.

18. The computer-readable storage device of claim 17, wherein the operations further comprise:
  determining that the call is from a pre-identified contact; and
  overriding the setting in response to determining that the call is from the pre-identified contact.

19. The computer-readable storage device of claim 17, wherein the operations further comprise:
  determining that the call is a priority call; and
  overriding the setting in response to determining that the call is a priority call.

* * * * *